(12) United States Patent
Lilien et al.

(10) Patent No.: US 8,184,015 B2
(45) Date of Patent: May 22, 2012

(54) DEVICE, SYSTEM AND METHOD FOR REAL-TIME MONITORING OF OVERHEAD POWER LINES

(75) Inventors: Jean-Louis Lilien, Angleur (BE); Jacques Destine, Beaufays (BE)

(73) Assignee: Université de Liège, Angleur (BE)

( * ) Notice: Subject to any disclaimer, the term of this patent is extended or adjusted under 35 U.S.C. 154(b) by 1123 days.

(21) Appl. No.: 11/990,925

(22) PCT Filed: Sep. 5, 2006

(86) PCT No.: PCT/EP2006/066003
§ 371 (c)(1),
(2), (4) Date: Feb. 25, 2008

(87) PCT Pub. No.: WO2007/031435
PCT Pub. Date: Mar. 22, 2007

(65) Prior Publication Data
US 2009/0243876 A1    Oct. 1, 2009

(30) Foreign Application Priority Data

Sep. 16, 2005   (EP) .................................... 05108525

(51) Int. Cl.
*G08C 19/16* (2006.01)
(52) U.S. Cl. ............................... 340/870.04; 340/870.05
(58) Field of Classification Search ............. 340/870.07, 340/870.02, 870.04, 870.05, 870.08, 870.16
See application file for complete search history.

(56) References Cited

U.S. PATENT DOCUMENTS

| | | | |
|---|---|---|---|
| 4,709,339 A | 11/1987 | Fernandes | |
| 4,728,887 A | 3/1988 | Davis | |
| 5,235,861 A | 8/1993 | Seppa | |
| 5,454,272 A | 10/1995 | Miller et al. | |
| 5,717,388 A * | 2/1998 | Janoska et al. | 340/870.16 |
| 6,177,884 B1 * | 1/2001 | Hunt et al. | 340/870.02 |
| 6,476,521 B1 * | 11/2002 | Lof et al. | 307/105 |
| 6,523,424 B1 | 2/2003 | Hayes et al. | |
| 6,660,934 B1 * | 12/2003 | Nourai et al. | 174/40 R |

(Continued)

FOREIGN PATENT DOCUMENTS

DE          32 03 935          8/1983
(Continued)

OTHER PUBLICATIONS

Ishino et al. "Measurement of Frequency Response of Overhead Power Lines to Wind." Power Engineering Society 1999 Winter Meeting, IEEE New York, vol. 2, Jan. 31, 1999, pp. 1327-1330.

(Continued)

*Primary Examiner* — Fritz M Fleming
(74) *Attorney, Agent, or Firm* — Jacobson Holman PLLC

(57) ABSTRACT

A lightweight and energetically autonomous device for real-time monitoring of overhead power lines, comprising:—an external housing (EMS1) provided, at opposed ends thereof, with a first (OP1) and a second (OP2) opening for a power line cable (HVC) traversing said external housing; a monitoring subsystem (B) for monitoring at least a mechanical parameter of said overhead power line; and—a communication subsystem (D) for transmitting monitoring information generated by said monitoring subsystem; characterized in that: an internal housing (EMS2) is provided within said external housing (EMS1), said power line cable (HVC) passing outside said internal housing (EMS2); said monitoring subsystem (B) is disposed within said internal housing (EMS2); said external (EMS1) and internal (EMS2) housings are both made of a conducting material in order to form electromagnetic shields; and said monitoring subsystem (B) comprises at least an oscillation sensor for detecting mechanical oscillations of said power line cable (HVC).

15 Claims, 4 Drawing Sheets

U.S. PATENT DOCUMENTS

Figure 1:
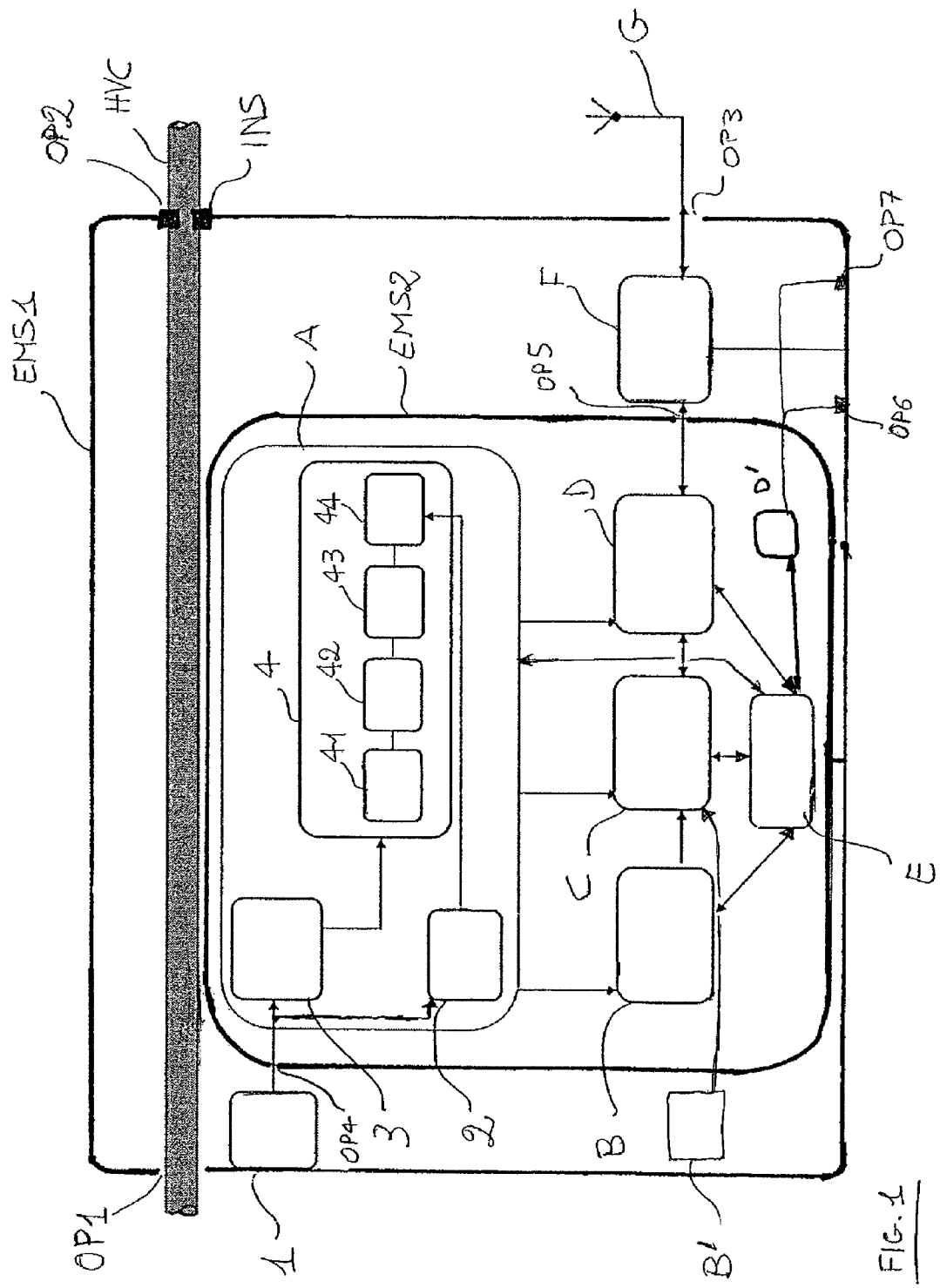

| | | | |
|---|---|---|---|
| 7,430,932 B2 | 10/2008 | Mekhanoshin et al. | |
| 2002/0089802 A1* | 7/2002 | Beckwith | 361/63 |
| 2006/0114122 A1* | 6/2006 | Jones | 340/870.07 |
| 2006/0202820 A1* | 9/2006 | Schwabe et al. | 340/539.22 |

FOREIGN PATENT DOCUMENTS

| | | |
|---|---|---|
| EP | 1 574 822 | 9/2005 |
| GB | 1 420 675 | 1/1976 |
| GB | 1 358 994 | 7/1994 |
| WO | WO 2004/038891 | 5/2004 |

OTHER PUBLICATIONS

Ren et al. "Empirical Formulas to Estimate Cable Tension by Cable Fundamental Frequency." Structural Engineering and Mechanics, vol. 20, No. 3, Mar. 22, 2005, pp. 363-380.

Wang et al. "Using PVDF Piezoelectric Film Sensors for in situ Measurement of Stayed-Cable Tension of Cable-Stayed Bridges." Smart Materials and Structures, Oct. 1999, pp. 554-559.

Morgan. "Thermal Behavior of Electrical Conductors, Steady, Dynamic and Fault-Current Ratings." Research Studies Press Ltd, 1991.

Rhodes et al. "Flush Mounted Antenna for Mobile Applications." Electronics, Mar. 1949, pp. 115-117.

Kiessling et al. "Overhead Power Lines." Springer 2003, pp. 338-341.

Deb et al. Power Line Ampacity System, Theory, Modelling and Applications, CRC Press 2000.

International Search Report dated Nov. 24, 2006.

* cited by examiner

DEVICE, SYSTEM AND METHOD FOR REAL-TIME MONITORING OF OVERHEAD POWER LINES

This is a national stage of International Application No. PCT/EP2006/066003 filed on Sep. 5, 2006 and published in English.

The invention relates to a device and system for real-time monitoring of overhead electrical power lines (single or bundle conductors) in operation and to a monitoring method based on the use of such devices.

Continuous monitoring of electrical power lines, and in particular of high-voltage overhead lines, is essential in order to timely detect anomalous conditions which could lead to an outage. In some cases, monitoring allows avoiding the outage, e.g. by reducing the power transmitted by an overheated conductor while in other cases (e.g. cable in a wind storm) a localized outage is unavoidable, but timely intervention (e.g. by using monitoring information to redirect power flow) can avoid its propagation through the power grid leading to a generalized blackout. This necessity has been made even more compelling by the deregulation of the energy market, forcing electrical companies to operate power lines at different conditions than they were originally designed for and pushing toward a more efficient exploitation of existing infrastructures. Another consequence of deregulation it is that today it is much more difficult to put a power line off for maintenance than it was in the near past.

Monitoring of an overhead power line should allow identifying a number of potentially hazardous conditions:

Wind-induced oscillation, including vibrations (wavelength much shorter than the span, which is the distance between two adjacent cable supports), sub-span oscillations (intermediate wavelength) and galloping (wavelength of the same order of magnitude of the span), can lead to mechanical failure of cables, insulators or pylons or, particularly for galloping, to short-circuits between conductors of different phases.

Other mechanical stresses, such as vibrations and movements of different origins and ice/snow loading and shedding in winter condition, may produce mechanical damage.

Breaking of strands.

Temperature-induced increase of the line sag (maximum vertical distance in a span between the conductor and the straight line passing through the two supports) can occur if an excessive amount of power is transmitted through a line and particular meteorological conditions are met. This is extremely dangerous because, if the distance to the ground level or any obstacle is decreased below a certain level, a flashover may occur between the conductor and, e.g. trees. Beside its importance for the prevention of faults and incidents, sag monitoring is also useful in order to determine the actual ampacity of the conductors (i.e. the maximum allowable current) depending on existing power transit, ambient temperature, sun exposition, wind, precipitations, etc, thus allowing an optimal exploitation of the power line. In fact, without such a monitoring, electrical companies are forced to operate the line under worst-case assumption, without making full use of the actual ampacity.

Power line monitoring also allows predictive maintenance in case, e.g. of abnormal high levels of vibrations detected which would suggest reinforcing the line protection.

Given the importance of power line monitoring, several devices have been proposed to measure at least some of the relevant parameters.

For example, it is known to install displacement measurement systems at a given (short, e.g. 89 mm) distance from a cable suspension point in order to measure high-frequency vibrations, but this is only a partial solution to the monitoring problem and, in particular, it does not allow ampacity determination.

A number of different methods, either direct or indirect, to perform sag measurement, and therefore ampacity determination, are also known. An example of direct sag measurement consists in the optical detection of a target clamped on the monitored conductor by a camera fixed to a pylon. Examples of indirect methods include measurement of the conductor temperature or tension. Beside the fact that they only allow a partial monitoring of the power line, all of these methods suffer from drawbacks: optical techniques are sensitive to reductions of the visibility induced by meteorological conditions while indirect measurements are inaccurate, since sag has to be deduced by algorithms which depend on unavailable and/or uncertain data (e.g. wind speeds) and/or uncertain models.

Document WO2004/038891 discloses a multisensor device for mounting on a span of an overhead power line. Such a device comprises a housing with openings which may allow a camera to point external targets. The housing is traversed by the monitored cable and contains a plurality of sensors for measuring, e.g. air and line temperatures, line slope and ground clearance. Monitoring information is transmitted through a radio-frequency channel and power supply is extracted from the monitored line by a transformer. A drawback of this device is that its sensors only provide static or quasi-static measurements and therefore it does not allows a full monitoring of the power line in dynamical conditions.

Document U.S. Pat. No. 4,728,887 discloses a monitoring device whose housing is adjacent to the overhead line. This housing is attached to the power line thanks to a clamp and, contrary to the present invention, is not traversed by the monitored cable. A drawback of this device is that the assessment of the current carrying capability relies on a punctual measurement of the conductor surface temperature. It is a well known fact that there exist longitudinal, radial and circumferential temperature gradients in a power line conductor (see e.g. V. T. Morgan, "Thermal behaviour of Electrical Conductors, Steady, Dynamic and Fault-Current Ratings", Research Studies Press Ltd, 1991) and that the current carrying capability of a given line is reached when either its average temperature or the clearance between the line and obstacles reach a given limit. The device disclosed in U.S. Pat. No. 4,728,887 does not give any information on the clearance between the line and obstacles and solely gives partial information to assess the average line temperature and therefore does not allow a full assessment of the current carrying capability of the overhead line.

The present inventors have identified a need for a power line monitoring device and system overcoming at least some of the problems left open by prior art solutions. A monitoring device according to the invention is very well protected against electromagnetic interferences, both quasi-static (low frequency electric and magnetic fields produced by normal operation of the line) and dynamical (transients due to commutations on the line, lightning, corona discharges, etc) and, despite being simple and lightweight, it allows recovering the real time-dependent shape of the whole span in any static or dynamic situation and independently from meteorological conditions and/or visibility. Moreover, the monitoring device according to the invention may be located anywhere in the span.

An object of the invention is a monitoring device according to claim 1. Such a monitoring device is provided with a housing whose design ensures a remarkably good electromagnetic shielding of the monitoring electronics. This allows operating, even in the harsh environment constituted by the vicinity of a high voltage (tens to hundreds of kV) overhead power line, sensitive electronics and electromechanical microsystems for performing a complete monitoring of sag, vibrations and movements of the line. Use of microsystems allows reducing the overall weight of the device which, in turn, avoids an excessive perturbation the mechanical properties of the monitored power line which could affect the significance of the measurements.

Preferred embodiments including advantageous additional technical features are defined by the dependent claims 2 to 7.

Another object of the invention is an overhead power line monitoring system comprising a plurality of monitoring devices, according to claim 8.

Still another object of the invention is a method for monitoring an overhead power line according to claims 9 to 16.

Figure 2A:
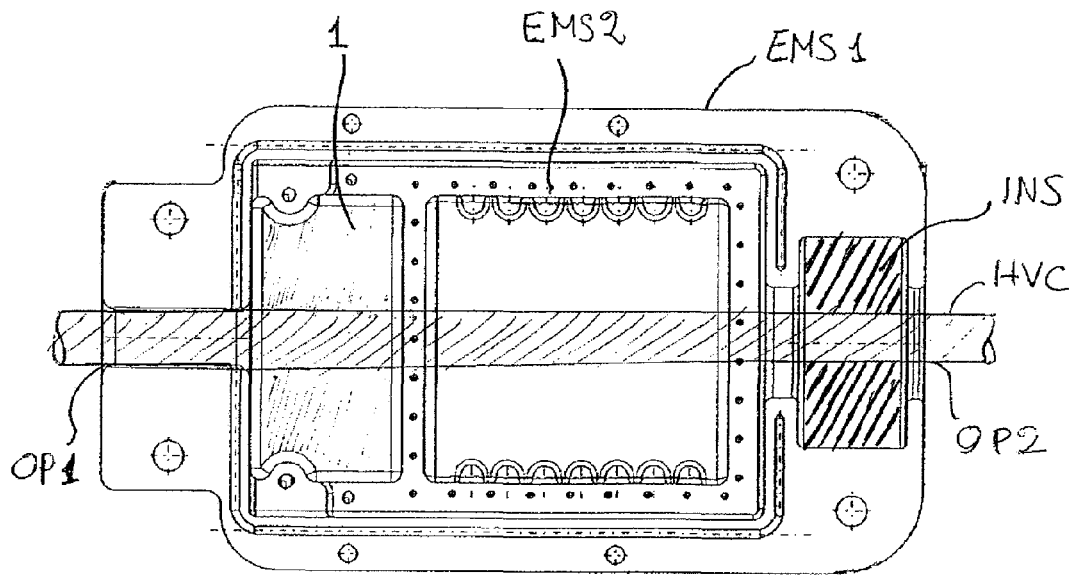
Figure 2B:
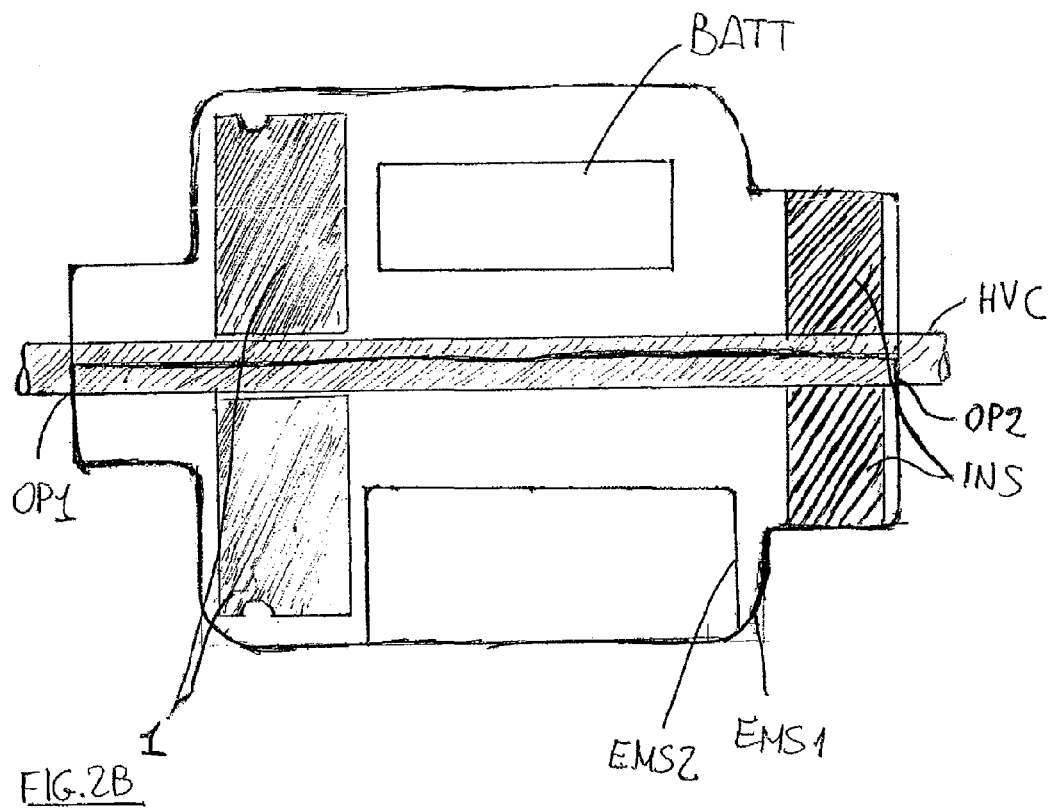
Figure 3:
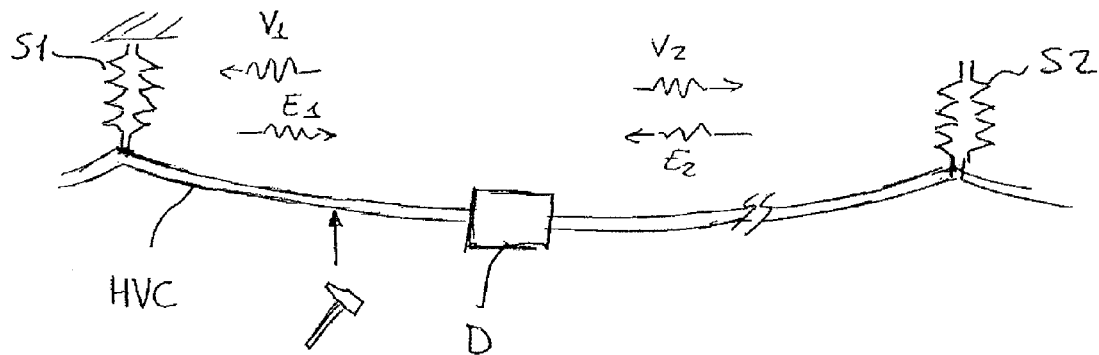
Figure 4:
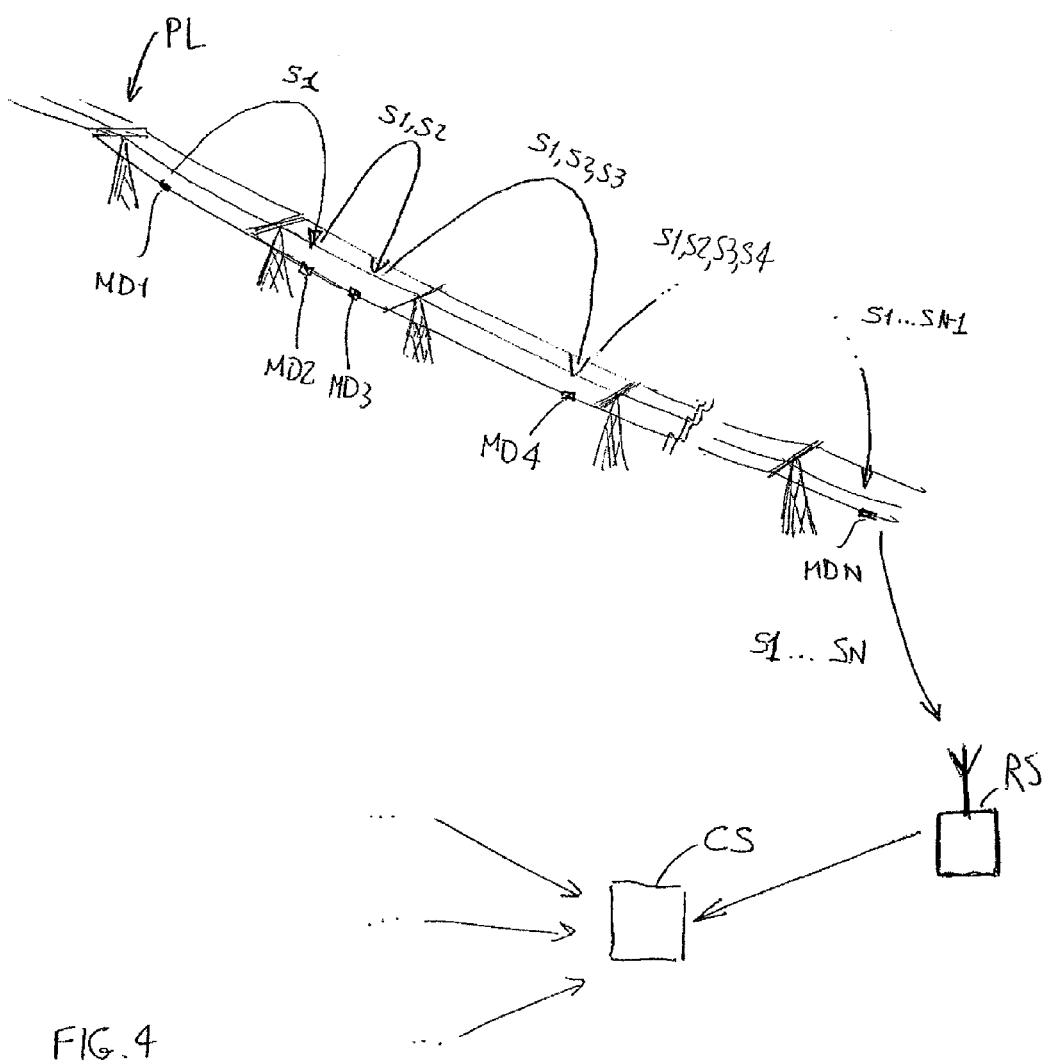
Figure 5:
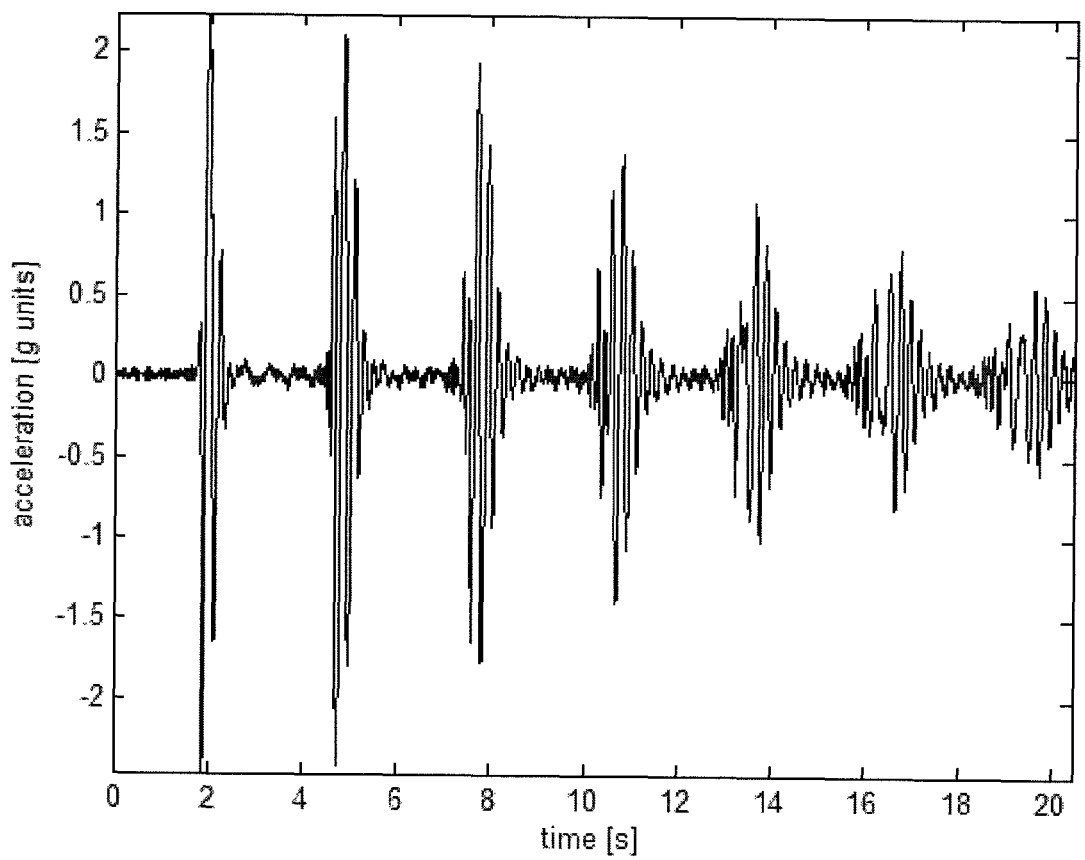

Additional features and advantages of the present invention will become apparent from the subsequent description, taken in conjunction with the accompanying drawings, which show:

FIG. 1, a block diagram of the monitoring device of the invention;

FIGS. 2A and 2B, cross-sectional view of a particular embodiment of a monitoring device of the invention, taken along a horizontal and a vertical plane respectively;

FIG. 3, a schematic representation of a method for determining the position of a monitoring device on a span of a power line;

FIG. 4, a schematic representation of a monitoring system comprising a plurality of interconnected monitoring devices mounted on a power line; and FIG. 5, a vibration signal showing the response of an overhead conductor to a driving impulse as measured by a device of the invention.

FIG. 1 shows that the monitoring device of the invention is contained within an external housing EMS1 constituted of a conducting material (e.g. metal) in order to provide an electromagnetic shielding protecting its content from external electromagnetic fields and electrical discharges, mainly thanks to the "Faraday cage" effect. Housing EMS1 is provided, at its opposite ends, with two openings OP1 and OP2 for allowing a power line cable HVC traversing the device. The edges of the first opening OP1 are in direct electrical contact with the cable HVC, whereby the conducting housing EMS1 is maintained at the same voltage of the power line; on the contrary, the second opening OP2 is electrically insulated from the cable HVC by insulating means INS: this ensure a single-surface contact and therefore avoids that the housing EMS1 constitute a path for the electrical load current flowing in the cable HVC. Preferably, in order to provide an optimal shielding effect, external housing EMS1 is completely closed, except for openings OP1, OP2 and a third opening OP3 for a radio-frequency antenna or infrared beam whose function will be discussed below.

Clamping means (not represented in FIG. 1) are disposed at the first and second opening OP1, OP2 in order to firmly clamp the device to the power line cable HVC. In an advantageous embodiment, clamping means can fit to different cable diameters, including or not armor rods, so that the same device can be mounted on a plurality of different power lines. Clamping means have been designed according to the design requirements given by CIGRE ("Conseil International des Grands Réseaux Electriques"—"International Council of Large Electric Systems") WG B2.11: see e.g. "State of the art survey on spacers and spacer dampers", Electra n°221, August 2005. In particular, the designed clamp must avoid damage to the conductor due to sharp edges and must provide a reliable long term grip: any loose clamp would lead to wear and hence damages on the line.

Since the power line cable HVC crosses the external housing EMS1, the inside of said housing is not completely protected against electromagnetic perturbation originated e.g. by transients on the line. For this reason, all the sensitive monitoring electronics, but preferably also power regulation, communication and control subsystems, are enclosed in an internal conducting housing EMS2, fully contained within the external housing EMS1 and in electrical contact with it, constituting a further electromagnetic shield. Since the power line cable HVC does not cross the internal housing EMS2, electronic elements are well protected even against transients on the line, and more generally against any conducted or radiated electromagnetic perturbation.

Some elements cannot always be contained within the internal housing EMS2. This is the case for the current transformer 1 which acts as a power harvesting means for extracting a small amount of power (typically preferably comprised between 0.1 and 10 W, mostly depending on the range of the radio link; a power level of 1 W or less is preferred) from the power line and supplying it to the electronics subsystems of the monitoring device. Use of such a power harvesting means makes the devices fully autonomous, without the need for a separate power source. It should be noted that, if the external housing EMS1 were electrically connected to the cable HVC at both end, a significant current would flow along its walls, thus bypassing the transformer and reducing the efficiency of the power supply subsystem.

The magnetic material used for the current transformer 1 has been chosen for its high permeability and maximum flux density in order to reduce its weight and increase its durability in a harsh environment. As an example, a 0.3 mm strip wound SiFe core is a suitable choice. A specific casing has been designed in order to protect and fasten easily the core, which is cut in two parts for mounting on the line: the two parts of the core are inserted into two separate flanged pipes which are fixed on EMS1; the winded part of the transformer is installed in the lower part of EMS1 and feeds the electronics housed in EMS2. The transformer casing, which is made of two parts with appropriate fittings to ensure durable fixation to EMS1, comprises a high-temperature compliant and robust phenolic case, closed with a pressure fitted insert. To ensure durability of the magnetic core, an inert cushioning (e.g. high-temperature silicon) is inserted between the core and the box (see, for example, Application Note "TWC-600 Tape Wound Core", Magnetics Inc.). The two-part core can be directly wound and, for final protection, an epoxy layer is cast all over the windings. The core and case size as well as the number of winding turns may vary as a function of the cable geometry and nominal current in the line. It is based on a typical statistical current flow in the line and allows continuous powering covering more than 95% of occurrences. Winding is made of a typical transformer wire, such as AWG 19-26.

A Hall effect gauge may be used to evaluate current flow in the HVC cable.

A very low DC power version of the monitoring device may even comprise, instead of transformer 1, a partial core transformer entirely located within EMS2.

The electrical power extracted by transformer 1 is supplied to a power subsystem A, preferably enclosed within the internal housing EMS2, comprising:

- protection means 3 connected in series and in parallel at the output of the transformer in order to protect the downstream electronics from overcurrent and overvoltage surges (these protection means could also be located outside the internal housing EMS2, or comprise two subsets of devices, one disposed outside the internal housing and the other inside it); due to the impossibility of intervention on the module, only resettable protective devices (e.g. "PolySwitch" from Raychem) can be used, together with surge suppression devices and voltage clamping Zener diodes;
- regulated power supply means 4, usually comprising a rectifier 41, a smoothing capacitor 42, a DC/DC converter 43 and a regulator 44; and
- energy storage means 2, e.g. storage batteries or supercapacitors (capacitors with a multi-Farad capacity and a high energy-storage density), and an energy management system. Energy storage means are charged by the energy harvesting means 1 and acts as an auxiliary power source for the monitoring device in case energy transmission over the power line is discontinued or when power line disturbances are present. While it is preferable that the energy management system is located within the internal housing EMS2, energy storage means themselves can be provided outside it, but inside the external housing EMS1.

Monitoring electronics is essentially or exclusively constituted by a multisensor board B, wholly contained within the internal housing EMS2. In a preferred embodiment, a mechanical oscillation sensor assembly is used as the primary sensor. A mechanical oscillation sensor is a sensor whose output allows the measurement of the 1D, 2D or 3D mechanical oscillation at the point where the sensor is fitted by e.g.: an accelerometer. The oscillation sensor assembly will preferentially be located near the second opening OP2, as close as possible to the power line cable HVC. In a working prototype, a Crossbow MTS400 module has been used as the multisensor board B. An accelerometer is particularly interesting in this kind of application as it can be built in the form of an electromechanical microsystem having extremely reduced weight, dimensions and power consumption, therefore it allows obtaining a particularly lightweight monitoring device, which can monitor a power line without severely perturbing its mechanical properties.

Proper data acquisition can only be made in a known environment: acceleration measurement precision depends on temperature and supply voltage. For this reason, a high precision voltage regulator 44 and preferably also temperature sensors are needed to ensure precise measurement in all conditions.

Moreover, a three-axis accelerometer assembly with a range of frequency comprised between 0 and at least 100 Hz, unlike the inclinometers of WO2004/038891, allows a complete determination of the time-dependent span configuration in any static or dynamic condition. The accelerometer response in quiet conditions provides three tilt measurements, from which spatial position of the cable HVC is computable as gravity basic acceleration is known and purely vertical. In ambient vibrations, already available at very low wind speed preferably comprised between 0.5 and 2 m/s and most preferably between 0.5 and 1 m/s, accelerometers are able to detect basic oscillation modes of the line. First of all, sag is evaluated by using even modes of the span (mainly modes 2 and 4), since a direct relationship exists. Even modes in two orthogonal positions (the two accelerometers measuring transverse movements) must be the same. Correlation with other redundant information is used to increase the certainty of the measured value. The redundant information comprises cable inclination, based on the DC component of the accelerometer signal. The full spectral components of the acceleration allow an accurate real time evaluation of the power line movements. A significant advantage of accelerometers is that they also provide with an almost total freedom of positioning of the device at any point of the span, which is not the case with inclinometers, which are only effective when they are mounted on significantly inclined portions of the cable.

As mentioned above, magnetic field sensors, such as Hall effect sensors, can also be provided in order to measure e.g. the current carried by the power line. In some embodiments, environmental parameters (e.g. temperature, atmospheric pressure, wind speed estimates, solar light flux, . . . ) may be collected by a secondary sensor board B' residing in EMS1 and in communication with the exterior through dedicated or existing tiny holes in EMS1, like OP6 and OP7.

Raw data from multisensor board B are passed to a signal processing subsystem C for filtering, A/D conversion, merging and compression of data from different sensors, and then to a (preferably digital) radio-frequency Tx/Rx communication subsystem D (or an infrared communication subsystem), which transmits them to a remote station for further processing. In a working prototype, subsystems C and D have been implemented with the help of a single Crossbow MPR410 module. In an advantageous embodiment, the communication subsystem D is not only used to transmit the monitoring information generated by the device to which it belongs, but it also functions as a repeater to relay data transmitted by similar devices disposed on the same power line further away from said remote station. This network operation will be discussed with more detail with reference to FIG. 4. Also, communication subsystem D allows remote control and diagnosis of the monitoring device. The radio-frequency Tx/Rx communication subsystem D can include a GSM (mobile communication systems) and in an advantageous embodiment the communication means used can be bi-directional.

Communication subsystem D is connected to an external antenna G through radio frequency protection means F located outside the internal housing EMS2. These protection means can include devices such as quarter-wave stubs, protective gas filled spark-gaps and insulation transformers, and operate to avoid that overvoltages and overcurrent induced by lightning and electrical discharges could propagate from the antenna G to the communication system D and damage the sensitive electronics contained within EMS2. It is observed that the only openings OP4, OP5 in the internal housing EMS2 are associated with the connections of the transformer 1 and of the communication subsystem D; special care must be taken in order to avoid that these opening allow the propagation of electromagnetic interferences into said internal housing, for example by using properly designed connectors. The general grounding reference is located near the antenna opening OP3 and is common to the transformer 1 and the electronics subsystems, but other design options are possible. System compaction is extremely important to reduce distances between different groundings, thus allowing a unique voltage reference.

Antenna G has an anti-corona design and positioning and can comprise a dielectric cladding. In an alternative embodiment, part of the external housing EMS1 acts itself as an antenna. For example, such an antenna is made by cutting a thin annular slot on the conducting surface. Several feed systems exist for slot antennas and they provide several advantages such as a light weight, a minimum resistance to the wind and no need for mechanical fasteners. An article by D. R. Rhodes "Flush mounted antenna for mobile applications", Electronics, 22, pages 115-117, March 1949 describes one of the possible ways of integrating an antenna on EMS1.

Operation of the electronics subsystems of the monitoring device according to the invention is supervised by a control subsystem E, generally comprising a microcontroller. Advantageously, control subsystem E can communicate with the remote station by mean of the communication subsystem D: this allows remote control, remote diagnostics of the monitoring device and control software upgrading.

In an advantageous embodiment, an auxiliary, short-range communication system D' is also provided for directly address the control subsystem of a single device. Such an auxiliary communication system D', realized e.g. in the form of a free-space optical link (requiring two tiny opposite openings OP6, OP7 in housings EMS1), can allow a partial recovery of the device in case of a partial failure. For example, if the main communication subsystem F is damaged, the auxiliary one can be used to perform a diagnosis of the device and to force it in a degraded operation mode compatible with its status. This is particularly important as there are very few opportunities for maintenance or replacement of monitoring devices, since any intervention is only possible only when the power line is put off-potential for an independent reason (putting off-potential specifically for maintenance of the monitoring system does not make sense for economical reasons).

FIGS. 2A and 2B show a particular embodiment of the invention, in which the features discussed above are identified by the same reference symbols used in FIG. 1. Other shapes for the housing are conceivable, e.g. ellipsoidal or egg-shaped. The overall dimensions of the device are preferably 30×16×16 cm and the weight of the order of 3 kg, but this is only a prototype, and using a more compact arrangement dimensions can be reduced to, e.g. 15×15×20 cm, and weight to 1 kg or less. To achieve maximal weight reduction, the wall thickness of housings EMS1 and EMS2 has to be minimized, constrained by the need for sufficient mechanical strength and electromagnetic shielding. Use of a light material such as aluminum is also advantageous. It should be observed that, in order to avoid the risk of electrical discharges, the external shape of the external housing EMS1 does not comprise any sharp angle or corner. In the exemplary embodiment, the shape of said external housing is that of a rounded parallelepiped wherein the curvature radiuses of angles and corners are chosen depending to the power line voltage, but other shapes are conceivable. The prototype of FIGS. 2A and 2B has been tested for an extended time period (more than one year) on a 70 kV power line and on a 220 kV power line but, with appropriate design, a monitoring device according to the invention can be operated on power lines with voltage levels up to 765 kV, which has been tested in laboratory. Inversely, the invention can also be applied to lower-voltage power lines, e.g. operating at 15 kV.

Good design of the external housing EMS1 and antenna G ensures that the electric field on them is preferably between 13 and 21 kV/cm (rms) and most preferably between 13 and 15 kV/cm (rms) in the actual situation of the cable in the space, in the presence of ground and other phases. However, given the small size of the monitoring device, evaluation can be performed by considering the system installed on the cable a few meters long and in infinite space. This is actually done by known software able to compute electrostatic fields in three-dimensional configurations. In the case of bundle conductor lines, profit may be taken of near-zero field magnitude between subconductors of the same phase.

All materials used in the monitoring device should advantageously be ozone-resistant and able to operate in a temperature range between −20° C. and +75° C., possibly between −45° C. and 150° C. or more.

In the device of FIGS. 2A and 2B, the external housing EMS1 is symmetrical with respect to the power line cable HVC, apart from the antenna opening OP3, with the internal housing EMS2 situated in its lower part and the energy storage means (batteries and/or supercapacitors) BATT in its upper part, but this is only an example and the person skilled in the art could come to a great number of shapes and configurations falling within the scope of the present invention.

It has been mentioned before that a monitoring device MD according to the invention can be disposed at almost any location on the span of a power line cable, but that proper interpretation of the monitoring data generally requires knowledge of its relative position with respect to the opposite ends of said span. FIG. 3 shows that a relative position measurement can be easily performed, without the need for any additional instrumentation, by simply generating an impulsive mechanical perturbation on the power line (hitting the cable HVC with a hammer or similar) and detecting, with the help of the accelerometers of the monitoring subsystem B, the resulting vibration signal V1, V2, and of the corresponding echoes reflected by the cable suspension means S1, S2 at opposite ends of the span. Measurements of the time delay between said vibration and echo signals provide a straightforward determination of the relative position of the monitoring device MD with an accuracy which is sufficient for the intended application. FIG. 5 shows a typical response of the device due to hammer impact test after installation. It can be seen that periodical bursts of high-frequency oscillations (or vibrations) propagate back and forth along the power line cable, the time delay between consecutive bursts providing positioning information for the monitoring device MD.

A complete monitoring system according to the invention comprises a plurality of monitoring devices MD1, MD2, . . . , MDN disposed on spans of a power line PL and a remote station RS for data collection and processing, as represented on FIG. 4.

A number of remote stations RS (only one of which is represented), each devoted to the monitoring of a single power line PL, can be connected to a central station CS through a suitable communication channel, such as the internet or a GSM (Mobile communication system) network. The central station gathers monitoring information coming, e.g. from all the power lines in a given geographical area.

If monitoring devices MD1, MD2, etc. are directly connected to a suitable telecommunication system such as a GPS or GPRS network, the remote stations RS can be dispensed for, measurement data being transmitted to the central station CS through said telecommunication system. In this case, it is advantageous that monitoring devices comprise a pre-processor in order to compress raw measurement data before transmitting them.

Monitoring data are processed at the remote station RS in order to convert raw measurement data into directly exploitable monitoring information; it will be understood that monitoring devices MD1, . . . MDN can comprise a data processor in order to perform in-situ pre-processing of said measurement data. When the monitoring subsystem B of the monitoring devices MD1, . . . , MDN comprises accelerometers, processing can take place as follows.

First of all, acceleration measurement signals are collected for a given period (for example 20 seconds).

The collected signals are then filtered (e.g. Wavelet and multiresolution analysis and/or by matching pursuit) and missed data, if any, are filled in, typically by a Singular Spectrum Analysis method. The order of the filtering and filling operation is not essential.

The same analysis (particularly by Wavelets Transform) also gives access to modal damping.

The complete set of measurements is then broken down into files comprising a predetermined number of samples, typically corresponding to a period of 20-40 seconds. Depending on the analysis method used in the following step, the length of each file (expressed in number of samples) must be dyadic or not.

All files undergo a frequency or time-frequency analysis by Fourier Transform, Short Time Fourier Transform, Wavelet Transform or Matching Pursuit.

A fundamental frequency is calculated with detected frequencies and linear interpolation is done with detected frequencies (for example corresponding to the second and fourth out-of-plane mode). Calculation is performed as follows:

A virtual plot giving e.g. frequencies (in Hz) versus mode number (1, 2, 3, 4 . . . ) is drawn using "dots" coming from the frequency or time-frequency analysis step. A linear fit using the origin of the graph (0,0) and the dots around modes 2 and 4 gives access to the fundamental frequency, which is the angular coefficient of the fitted straight line. It must be pointed out that the fundamental frequency is half the second mode and one forth of the fourth mode. The proposed linear fit smoothes data based on four measurements (two in-plane and two out-of-plane dots, see later). In fact, fundamental frequency does not necessarily exist on actual cable structures like overhead lines and is not necessarily visible in the frequency analysis performed on measurement data, but its value is particularly important for the monitoring method of the invention. For each mode number there are two dots at least, coming from two different measurements in two orthogonal positions. Data processing based on monitoring device tilt in a plane perpendicular to the cable is used to link these two dots to two different movements: in-plane and out-of-plane. In-plane movement takes place in the plane defined by the two extremities of the span and the mid-span point, while the out-of-plane movement is perpendicular to this plane. Typically, for at rest conditions, the in-plane movement is vertical and the out-of-plane one is horizontal. For overhead lines typical data, the in-plane and out-of-plane modes have different frequencies for odd mode numbers.

Sag is then directly determined on the basis of said fundamental frequency. The power line span is basically a taut string structure, and a mathematical expression for the frequencies of such structures is known. Modal frequencies depend on T (tension in the cable, expressed in Newtons), m (cable mass for unit length, expressed in kg/m) and L (cable length, expressed in meters). The lowest frequencies (e.g. less than 10 Hz) of cable spans typically used in overhead lines do not depend on the cable bending stiffness. The expression for the modal frequencies f is:

$$f = n \frac{\sqrt{\frac{T}{m}}}{2L}$$

where n is the mode number (n=1 for the fundamental mode, etc.). Actually, in the case of overhead lines the taut line formula is only valid for even modes, while for odd ones a correcting factor is needed: see H. M. Irvine, "Cable Structures", Bandung: Penerbit ITB, 1988 ISBN 979-8001-24-9. The mathematical expression of the frequency, valid for even modes, can easily be expressed as a function of sag instead of tension T. As an example, for a horizontal span of limited length the fundamental mode can be given by:

$$\frac{\sqrt{\frac{g}{32}}}{\sqrt{sag}}$$

where g is the gravity constant (9.81 m/s² at sea level), thus giving roughly the very simple formula for the fundamental mode f(n=1):

$$f(n=1) = \frac{0.55}{\sqrt{sag}}$$

if the sag is expressed in meters. Thus, fundamental frequency is directly linked to the sag value, without any dependency from conductor or span data such as tension, mass and span length and from conditions such as conductor temperature, extra weight due to ice or snow accretion, wind, solar heating, etc. In multi-span configurations (so-called sections), most of the modes of the section will be detected in all spans, but the even modes are proper to each span separately.

If required, low-frequency movements of the cable can be reconstructed period by period, based on sag and harmonics 1 to N, with N=5 if the fundamental frequency is larger than 1 Hz and in other cases N being a number obtained by dividing 5 by the fundamental frequency expressed in Hz.

Oscillations whose frequency is preferably comprised between 3 and 100 Hz are generally of aeolian origin and can be reconstructed on the basis of close frequencies near a high-frequency peak of power spectral density (typically 50% shift in minus or plus around the observed peak).

In the reconstruction of motion, the measurement of accelerations can also be replaced by measurements of displacements (vertical, horizontal longitudinal, of rotation etc).

It is know from fluid mechanics that the peak of power spectral density of oscillations (preferably comprised between 0.1 and 5 Hz and most preferably between 0.1 and 3 Hz) is observed at frequencies related to the wind speed and the conductor diameter by the Strouhal relationship, so that a given wind speed will generate vibrations in a close range of frequencies.

Wind-induced oscillations of frequency preferably comprised between 3 and 100 Hz may be recorded to evaluate the lifetime of the conductor (following for example the method developed by CIGRE safe border line, see F. Kiessling, P. Nefzger, J. F. Nolasco, U. Kaintzyk, "Overhead Power Lines", Springer 2003) and the span damping based on actually observed maximum vibration amplitude at given frequencies, which is the self damping if no damper is installed and which is the actual damping if a damper system is installed. A diagnostic of the power line span is done based on these two data. For example, predictive maintenance actions can then be obtained in terms of more damping needed to increase life time over 30 years Short events like breaking of strands or transients movements due e.g. to ice shedding can be detected in a similar way, but the presence of such disturbances forces breaking down the measurement data into shorter files, corresponding to periods of a few seconds. The breaking of strands can be identified by the Matching Pursuit technique, as the presence of corresponding frequencies is similar to a Dirac excitation which is present in all steps of Matching Pursuit. Redundancy data about the breaking of strands is related to the increase of modal damping. All these events (high frequency vibrations, breaking of strands . . . ) are related to ageing of conductor and may produce alarms if the level of vibration is giving excessive occurrences of high stresses and/or detection of a number of broken strands comprised between 1 and 5, and preferably equal to three.

The conductor average temperature influences the conductor length and hence its sag. Because of the longitudinal, radial and circumferential thermal gradients which exist in any conductor, the sag of a conductor is an image much more reliable of its average temperature than a punctual surface temperature measurement. The sag deduced from the data recorded by the present device can be used to calculate an equivalent mean conductor temperature in accordance with the change of state equation written as a function of sag instead of tension and taking creep into account: see e.g. Anjan K. Deb, << Power Line Ampacity System>>, CRC Press 2000, p. 79, eq. (4.2), (5.3) and (5.5).

Ampacity of the monitored power line cable can be calculated on the basis of its sag and/or equivalent mean temperature by applying, as it is known in the art (see e.g. Anjan K. Deb, "Powerline Ampacity System", "Theory, Modelling and Applications", CRC Press 2000).

Tiny holes, in a sufficient number (for example 5), may be envisaged in the housing. Pressure sensors can be connected to these holes by small pressure tubes. Wind speed (magnitude and direction) may be measured by these pressure sensors, after a calibration in wind tunnel for both wind speed and direction.

A single monitoring device MD1 . . . MDN can be mounted on a power line span, but in some cases two or more of them (MD2 and MD3 on FIG. 4) can be mounted on the same span, simultaneous measurements from these devices allowing recovering the phase of cable oscillations. In general, a device according to the invention will not be placed on each span of the power line but, for good monitoring, a density of at least two devices per kilometer is considered necessary in most circumstances. In general, monitoring of a single conductor (a single phase) of the power line is often sufficient, but in some cases a separate monitoring of each individual conductor will be necessary, thus multiplying the number of monitoring devices by three or six.

As discussed above, it is an advantageous feature of the invention that the communication subsystem D of monitoring device MDx (x=1-N) is not only used to transmit the monitoring information Sx (x=1-N) generated by the monitoring device to which it belongs, but it also functions as a repeater to relay data (signals S1, . . . Sx-1) transmitted by devices D1, D2, . . . Dx-1 disposed further away from the remote station RS. This network operation allows using very low power transmitters, with a transmission range comprised between 100 m and 10 km, which are lightweight, have a very reduced power consumption and do not need any transmission license. Operation range of frequency and power should depend on national regulations: for example, in Belgium, an ISM-band emitter with transmission power up to 100 mW can be freely used. As the monitoring devices D1 . . . DN act themselves as repeaters, a complete monitoring system can be composed of a plurality of such devices plus the remote station RS, without any additional apparatus.

It can be observed that, in the system of FIG. 4, the monitoring devices are disposed at "random" locations of the power line spans: this is a demonstration of the positioning freedom allowed by the invention. Of course, complete determination of the time-dependent power-line configuration require knowledge of the position of each monitoring device, but this can be obtained very easily thanks to the method represented on FIG. 3.

Although only power line cables have been considered in the description above, the invention can also be applied to the monitoring of substation busbars. In this case, the monitoring devices of the invention are mounted on said busbars instead than on cables, and only minor modifications, or no modifications at all, are necessary.

The invention claimed is:

1. An overhead power line monitoring device, comprising:
    an external housing provided, at opposed ends thereof, with a first and a second opening for a power line cable traversing said external housing;
    a monitoring subsystem for monitoring at least a mechanical parameter of said overhead power line; and
    a communication subsystem for transmitting monitoring information generated by said monitoring subsystem;
wherein
    an internal housing is provided within said external housing, said power line cable passing outside said internal housing;
    said monitoring subsystem is connected with said communication subsystem, and said monitoring subsystem and said communication subsystem are disposed within said internal housing;
    said external and internal housings are both made of a conducting material in order to form electromagnetic shields; and
    said monitoring subsystem comprises at least an oscillation sensor for detecting mechanical oscillations of said power line cable.

2. The overhead power line monitoring device according to claim 1, wherein:
    said external and internal housings are in electrical contact with each other and with said power line cable; and
    said external housing is electrically connected to said power line cable by a single contact surface, so that it does not provide a path for electrical load current flowing in the cable.

3. The monitoring device according to claim 2 wherein said oscillation sensor comprises at least one accelerometer, and preferably a three-axis accelerometer assembly with a passband extending between 0 Hz and 100 Hz.

4. The monitoring device according to claim 1, further comprising a power harvesting means for extracting electrical power from said power line cable and supplying it to at least said monitoring and communication subsystems.

5. The monitoring device according to claim 1, wherein said communication subsystem comprises receiving means for receiving monitoring information from other monitoring devices and transmitting means for retransmitting said received monitoring information, together with monitoring information generated by said monitoring subsystem.

6. The monitoring device according to claim 5 wherein said receiving and transmitting means are radio-frequency receiving and transmitting means, adapted for operating over a communication distance comprised between 100 m and 10 km.

7. An overhead power line monitoring system comprising a plurality of monitoring devices according to claim 5, said monitoring devices being disposed on spans of a power line, and a remote station for receiving monitoring data from said monitoring device, wherein each monitoring device is configured for transmitting to said remote station monitoring data generated by its monitoring subsystem and for relaying monitoring data transmitted by monitoring devices disposed further away from said remote station.

8. The monitoring device according to claim 1, further comprising an auxiliary bi-directional communication means for diagnostic and command purposes.

9. A method for monitoring an overhead power line comprising the steps of:
- clamping at least one monitoring device of claim 1 on spans of a cable of said power line;
- determining the position of said at least one monitoring device with respect to the opposite ends of the span;
- acquiring monitoring information from said at least one monitoring device, whose position is known, characterized in that said monitoring information comprises acceleration measurement signals and in that it further comprises the steps of:
- performing a frequency or time-frequency analysis of said acceleration measurement signals from said at least one monitoring device;
- determining a fundamental frequency from said frequency or time-frequency analysis; and
- determining the sag of the span, on which said at least one monitoring device is clamped, on the basis of said fundamental frequency.

10. The method according to claim 9 further comprising the step of determining an equivalent mean cable temperature for the span on which said at least one monitoring device is clamped.

11. The method according to claim 9 further comprising the step of determining the ampacity of said power line on the basis of its sag.

12. The method according to claim 9 further comprising a step of reconstructing movements of said cable.

13. The method according to claim 12, further comprising a step of identifying the breaking of strands on the basis of said reconstructed movements of said cable.

14. The method according to claim 12, further comprising a step of evaluating the oscillation damping of the span on which said at least one monitoring device is clamped.

15. The method according to claim 9 wherein said step of determining the position of said at least one monitoring device with respect to the opposite ends of the span comprises the sub-steps of:
- generating an impulsive mechanical perturbation on said cable;
- measuring the resulting vibration signals and the corresponding echoes reflected by said opposite end; and
- inferring said relative position from the time delays between said vibration and echo signals.

* * * * *